United States Patent [19]

Briffod et al.

[11] 4,341,939
[45] Jul. 27, 1982

[54] WIRE ELECTRODE FOR CUTTING AN ELECTRODE WORKPIECE BY ELECTRICAL DISCHARGES

[75] Inventors: Jean-Paul Briffod, Monnetier-Mornex; Roland Martin, Dingy en Vuache, both of France; Jean Pfau, Collonge-Bellerive, Switzerland; Bernard Bommeli, Dully, Switzerland; Danielle Schnellmann, Geneva, Switzerland

[73] Assignee: Ateliers des Charmilles, S.A., Geneva, Switzerland

[21] Appl. No.: 189,675

[22] Filed: Sep. 22, 1980

[30] Foreign Application Priority Data

Oct. 11, 1979 [CH] Switzerland ............................ 9170/79
Mar. 25, 1980 [CH] Switzerland ............................. 2318/80

[51] Int. Cl.³ .................................................. B23P 1/12
[52] U.S. Cl. .................................. 219/69 W; 219/69 E
[58] Field of Search ............... 219/69 E, 69 W, 145.1, 219/145.21, 146.1, 146.21, 146.22; 156/51; 174/126 CP

[56] References Cited

U.S. PATENT DOCUMENTS 4,286,026  8/1981  Cook et al. ................... 219/145.1 X Primary Examiner—B. A. Reynolds
Assistant Examiner—D. A. Tone
Attorney, Agent, or Firm—Hauke and Patalidis

[57] ABSTRACT

A metallic wire, for cutting a workpiece by electrical discharge machining, coated with at least one layer of a metal having a low temperature of vaporization and a film of a metal oxide on the metal layer. The metallic coating is preferably made of zinc and is subjected to an oxidizing thermal or electrolytic treatment such as to form on the surface of the metallic layer a thin film of zinc oxide.

18 Claims, 5 Drawing Figures

WIRE ELECTRODE FOR CUTTING AN ELECTRODE WORKPIECE BY ELECTRICAL DISCHARGES

BACKGROUND OF THE INVENTION

The present invention relates to the structure of a wire for a wire electrode cutting an electrode workpiece by electro-erosive intermittent electrical discharges, the wire having a core made of electrically conductive material and a coating of another material having a vaporization and melting temperature lower than that of the material forming the core. There is a category of EDM apparatus utilizing an electrode tool made of a metallic wire connected to an electrical pulse generator such as to cause electrical discharges to occur between the wire and a workpiece for cutting the workpiece. Wire-guiding and feeding means providing substantially rapid longitudinal motion of the wire form part of the EDM apparatus such that the active portion of the wire is continuously renewed, the guiding means providing also a lateral feed of the wire into the workpiece at a much slower rate for effectuating a cut in the workpiece according to a desired path. A small diameter wire, for example of a few tenths of a millimeter, permits to cut very fine details in the workpiece, but presents the disadvantage of considerably limiting the current intensity flowing through wire and the force of tension applied to the wire if rupture of the wire is to be avoided. Due to the lack of rigidity of the wire, precision and efficiency of machining substantially suffer. As the width of the gap between the wire and the workpiece is but a few microns, the smallest disturbing forces applied to the wire causes accidental engagements of the wire with the workpiece surface, which generally simply creates short circuits during which there is no machining of the workpiece.

Various attempts have been made in the past to improve wire electrodes. Copper, which was in common use at first, has been replaced by brass. Various alloys having improved mechanical strength under traction have been tried. Wire consisting of a steel core coated with a metal having good electrical conductance have also been tried. In United States Patent application Ser. No. 14,927, filed Feb. 27, 1979, and assigned to the same assignee as the present application, there is disclosed an electrode wire coated with a metal or alloy having a low vaporization temperature, such as zinc, cadmium, tin, lead, antimony, bismuth and alloys thereof, protecting the core of the wire against thermal shock resulting from the occurrence of electrical discharges and which permits to increase the frequency of the electrical discharges without running the risk of rupturing the wire. Some of the best results have been achieved with a zinc coating which, in a list of elements classified according to their vaporizing temperatures, is the first metal in the list presenting little, if any, inconveniences such as, for example, intense chemical activity or toxicity. The fact that zinc is easily electro-eroded does not present any inconvenience, because the portion of the wire subjected to electro-erosion is constantly renewed during cutting of the workpiece by electrical discharges.

SUMMARY OF THE INVENTION

The principal object of the present invention is to provide an increase of the machining speed of an electrode wire by eliminating the short circuits causing a decrease in machining efficiency, more exactly by rapidly effecting the transformation of non-erosive short circuited electrical discharges into electro-erosive effective discharges. By such a rapid transformation is meant the phenomenon occurring in the course of accidental contacts between the electrode wire and the workpiece which prevents runaway current flow in the short circuit and transforms the short circuit current into a machining electrical discharge in a very short period of time relative to the duration of the pulse, which is itself only a few microseconds in duration. The present invention has for its principal object to trigger such a phenomenon with an efficiency and speed hitherto unknown.

The electrode of the invention is characterized by a structure comprising a wire coated with at least one layer of a second material provided in turn on its surface with a thin film of a non-metallic material, the thin film having a thickness sufficient to provide a semi-conductive effect when the film is in contact with the electrode workpiece and when a voltage of a few volts is applied between the electrode wire and the electrode workpiece, the film becoming fully a conductor by electrical and/or thermal breakdown when the voltage thus applied rises between such value of a few volts and about 100 volts.

The invention will become apparent to those skilled in the art when the following description of the best modes contemplated for practicing the invention is read in conjunction with the drawing representing, schematically and for illustrative purposes only, two alternate structures of electrode wires according to the invention, and wherein:

DETAILED DESCRIPTION OF THE PREFERRED EMBODIMENTS

Figure 1A:
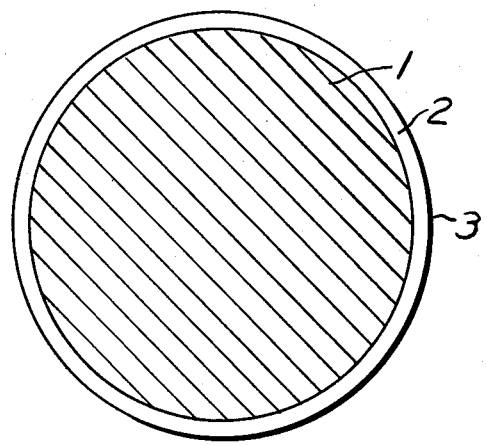
FIG. 1a is a transverse section through an electrode wire according to an aspect of the present invention.
Figure 1B:
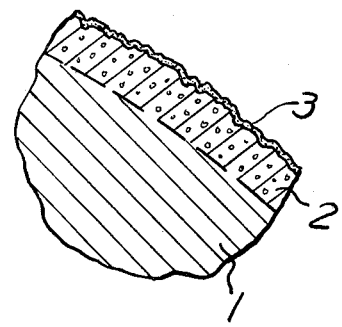
FIG. 1b is a portion of FIG. 1a illustrated at a larger scale.

Referring to the drawing, and more particularly to FIGS. 1a and 1b thereof, there is illustrated in a schematic manner a section through an electrode wire according to the present invention having a core 1 of copper and a superficial coating on the copper core of a film 2 of copper-zinc alloy coated in turn with a thin flim 3 of zinc oxide (ZnO). For example, the diameter of the copper core 1 may be about 220$\mu$, the coating of Cu-Zn alloy 2 has a thickness of about 8$\mu$ and the thin film 3 of ZnO is less than 1$\mu$ in thickness. Other materials than copper may be used for providing the wire core 1, as long as they satisfy requirements of good electrical conductivity, good mechanical strength and resistance to rupture. For example, the core 1 may be made of brass or steel with one surface layer of a metal being a good conductor of electricity. In order to obtain an electrode wire according to the invention, a metallic coating 2 of a few microns in thickness is electrolytically or electrolessly deposited on the core 1; in principle at least, any metal or alloy having a vaporization temperature lower than 1,100° C. can be used as long as the metal or alloy provides good adhesion to the metallic core, has adequate mechanical characteristics, is chemically stable and has a low toxicity, and on the condition that an oxide film can be formed or deposited on its surface. Good results have been achieved with a coating of a metal such as magnesium or any of the other metals discussed in the aforementioned co-pending application, namely cadmium, tin, lead, antimony, bismuth and alloys thereof. Best results have heretofore been achieved with a coating of zinc of 5 to 15μ electrolytically deposited.

Because the metallic coating 2 is relatively thin, its electrical resistivity may be high. A thickness of 5μ, for example, is of the same order of magnitude as the depth of the surface craters caused by electrical discharges. Plating of the metallic layer on the wire is followed by heating the wire in an oxidizing atmosphere, for example in ambient atmosphere, such as to cause on the surface of the layer 2 the formation of a thin film 3 of oxide of the metal, such as zinc oxide (ZnO) or any other metal oxide according to the metal of the layer 2.

It is advantageous to interrupt the oxidation of the zinc layer prior to transforming all the zinc into zinc oxide, because metallic zinc has a low temperature of vaporization which is a characteristic favorable to obtaining good machining conditions. In the course of the thermal treatment, there is obtained an intermix between the zinc and its oxide, such intermix apparently contributing to the good results achieved with the electrode wire structure of the invention.

Good results are obtained by heating the wire during at least two seconds at a temperature of at least 600° C. It seems that formation of the oxide film is substantially rapid at the beginning of the heat treatment, apparently because of the self protective quality of the oxide film, such that the oxide film has a thickness of less than 1μ, for example from 200 to 2,000 Å. It has been observed that the oxide film follows the irregularities of the surface and penetrates below the surface in the form of filament-like projections, several microns long, into the interior of the substrate. Tests have shown that the favorable machining results are not only limited to zinc oxide and that other metallic oxides may be used. It has been found practical to deposit on the top of the zinc coating a film, a few microns thick, of another metal which can be easily oxidized by heating in the presence of oxygen. Other oxides, which are also known as being semi-conductors, have been used, as for example CuO, $Cu_2O$, CdO, $In_2O_3$, PbO, $TiO_2$, $MnO_2$, MgO and NiO. Dielectric oxides, such as $Al_2O_3$, can also be used. When a voltage of a few volts to about 100 volts, according to the thickness of the oxide film, is applied across the thin film of one of the mentioned semi-conductor oxides, the film becomes suddenly conductive by thermal and/or electrical breakdown. When the voltage is less than a few volts, the oxide film leaks only a very weak current, thus preventing the appearance of short circuits. Consequently, the thickness of the film must be controlled with high precision to enable the thermal and/or electrical breakdown to take place under the difference of potential available at the output of the EDM pulse generator. The electrical performance of all those oxides depends not only on their chemical composition, but also on the method of preparation which determines their purity and their physical structure. The films in adhesion to the surface of the metallic layer can also consist of other non-metallic materials such as carbides, borides, silicides, sulfides and nitrides of various metals. In addition to causing oxidation of the metallic layer, it has been discovered that the thermal treatment results in at least two other effects worth mentioning.

First, the surface appears to be very rough, as if formed by an aggregation of crystals or grains of various dimensions from 0.1μ to a few microns, with many intergranular interstices bringing to mind the appearance of a sponge. Microscopic metallographic examination of a transverse section reveals the presence of many holes of 1 to 2μ, which confirms the sponge-like structure suggested by the appearance of the surface. The same examination reveals, in addition, that the thermal treatment causes a diffusion of copper atoms from the metallic core into the zinc coating and vice versa, such that pure zinc more or less disappears and is replaced by a copper-zinc alloy comprising about 10 to 20% copper.

When the speeds of diffusion of two metals in contact with each other are very different, the resulting phenomenon is known in metallurgy as the Kirkendall effect. It is known that zinc atoms diffuse more rapidly than copper atoms; consequently, the voids created by the zinc atoms diffusing into the core are not immediately filled by copper atoms, and this phenomenon may be the reason for the observed porosity of the coating.

It has been further observed that electrode wires obtained by the method of the invention are more easily wetted by the water used as a machining fluid. Thus, cooling of the electrode wire is greatly improved, which permits to increase the intensity of the current flowing through the wire.

The almost complete absence of short circuits during machining resulting from using an electrode wire according to the invention is most likely due to the action of the zinc oxide which, being a semi-conductor, opposes the passage of current between the wire and the workpiece during accidental contact therebetween. Any such accidental contact normally causes a short circuit with a very small resistance, and it is known that, as a result of high current flow, the metals in contact melt and become locally welded; this is what happens between steel and copper for example. By contrast, it is virtually impossible to weld to a workpiece an electrode wire made according to the present invention, apparently due to the fact that, during contact between the electrode wire and the workpiece, the rapid local heating caused by the high electrical resistance of the oxide film at the point of contact causes an evolution of the short circuit into an electrical discharge.

Figure 2:
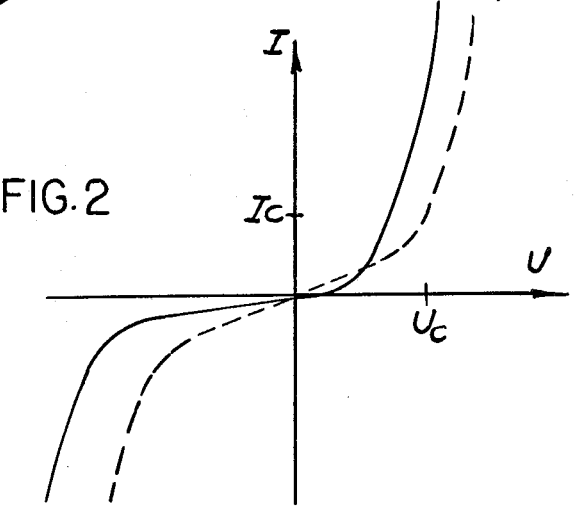
FIG. 2 is a graph representing current as a function of voltage as observed during engagement of the surface of an electrode wire according to the present invention with the surface of a workpiece.

FIG. 2 graphically illustrates a pair of typical characteristic curves of the voltage-current relationship, as observed in the course of accidental contacts between the electrode wire and the workpiece. According to the chosen point of contact and of the pressure exerted by one surface on the other during contact, a family of curves may be obtained, only two of which are represented respectively as curve (a) and curve (b). Curve (a) is typical of the more prevalent form of curve which presents an abrupt change of slope for a voltage value $U_c$ of 1 to 5 volts and for a current value $I_c$ of 0.1 to 1 mA. The lack of linearity and of symmetry of the curve is quite characteristic of a current-rectifying unijunction, which is not completely surprising because two materials with different conduction characteristics are in engagement with each other, namely a metal and a semi-conductor oxide. It is to be noted that the direction of "easy" flow of current corresponds to the wire being negative relative to the workpiece. Because the power rating of the EDM pulse generator is at least 150 volts under no-load conditions at more than 150 A in short circuit, it is readily apparent that even in the "easy" direction of current flow, the resistance to current flow is at least 1kΩ at the beginning of a pulse, resulting in an extremely rapid local heating of the surfaces at the point of contact.

Figure 3A:
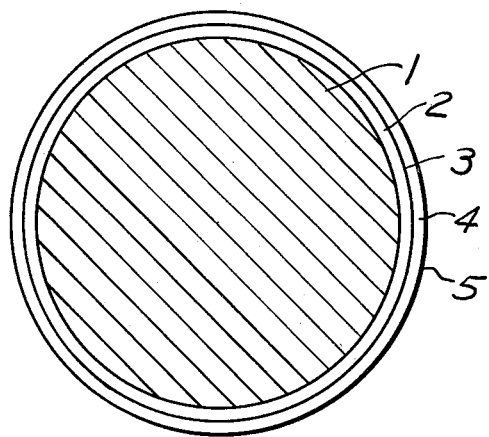
FIG. 3a is a view similar to FIG. 1a but showing a modification thereof.
Figure 3B:
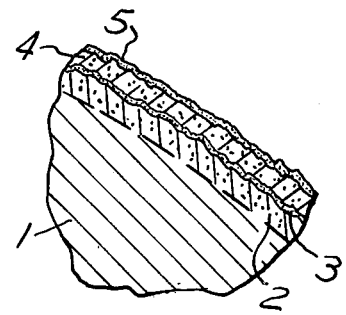
FIG. 3b is a portion of FIG. 3a illustrated but showing at a larger scale.

FIGS. 3a and 3b illustrate a cross-section through a wire having a core 1 of copper provided with two superimposed coatings 2 and 4 of copper-zinc each covered with a zinc oxide film, as shown respectively at 3 and 5. Instead of a single coating of zinc of 8μ, a first coating 2 of 2 to 4μ has been effected followed by a first heat treatment under the conditions hereinbefore disclosed, for forming a thin film 3 of ZnO. A second coating 4 of zinc of about 4μ is subsequently applied on the surface of the oxide thin film 3, followed by a second heat treatment similar to the first, providing on the surface of the second zinc coating 4 a thin film 5 of ZnO. With the structure of FIGS. 3a–3b, the same phenomena of diffusion of the copper into the zinc and vice versa have been observed, together with porosity of the coatings resulting in irregularities and roughness of the outer surface.

Such a structure, comprising two separate oxide thin films, remedies the relative fragility of structure consisting of a single oxide thin film whose thickness is limited substantially to 1μ and is subjected to local damages caused by the electrical discharges. Thus, by superimposing oxide films, an electrode wire is obtained having a long life active surface.

For machining workpieces 40 mm. thick, it is best to use an electrode wire comprising three or four coatings, each coating operation being followed by a heat treatment as previously described; if it is desired to cut a workpiece 100 mm. or more, thick, it is advantageous to use an electrode wire having even a greater number of coatings.

For example, a thin film of ZnO on the surface of a single zinc coating has permitted to increase the cutting speed of an electrode wire by 30% as compared to a similar electrode wire without an oxide film, while cutting a workpiece 40 mm. thick. If instead of a single coating, a first coating of 4μ of zinc is placed on the copper wire, followed by heat treatment, then followed by a second coating of zinc, 5μ thick, followed by heat treatment, the speed of cut is increased by 55%. With an electrode wire of the same diameter of copper core and of the same final diameter with a coating having a total thickness of 8μ, the best results are achieved by placing three or four coatings, each coating being followed by heat treatment. The improvement in cutting speed, under such conditions, is more than 60%.

Less impressive results, but still remarkable results, are achieved when the last coating of zinc is not followed by the oxidizing heat treatment. Under such conditions, because there is no oxide thin film in the surface of the coating, the electrical contact between the wire and the sliding contact supplying electrical current to the wire is improved and, because the zinc coating is rapidly damaged during machining, the oxide film on the subjacent zinc coating is uncovered, at least partially, before the wire leaves the machining zone, thus causing the desirable results hereinbefore described.

Another process for making an electrode wire according to the present invention consists, after cathodic deposition of a coating of a second material, for example zinc, in a first electrolytic bath containing for example a zinc salt in aqueous solution, in anodizing the coating wire in a second electrolytic bath for forming an oxide film on the surface of the zinc coating. Those two operations can be repeated as often as desired such as to form on the wire a plurality of superimposed metallic coatings provided each with a superficial thin film of oxide.

It will be appreciated that the core 1 of the electrode wire may consist of any appropriate material, metallic or non-metallic, good conductor of electricity or poor conductor, as long as the material selected has good mechanical properties, and as long as, if a poor conductor is selected it is plated superficially by electrolytic or electroless process, or by vapor-deposition, sputtering or other process, with a layer of a good conductor material or metal prior to coating with a layer of metal and a thin film of oxide as provided by the present invention. Electrode wires having a core of for example, steel or molybdenum may be used.

Having thus described the present invention, modification whereof will be apparent to those skilled in the art, what is claimed as novel is as follows:

1. An electrode wire for cutting a workpiece by electrical discharges, said electrode wire comprising a core of electrically conductive first material and a coating on said core of a second material having a vaporization and melting temperature lower than that of the first material, said coating comprising at least one layer of said second material provided with a superficial thin film of a non-metallic third material, said thin film having a thickness such as to display semi-conductor electrical characteristics when said film is placed in contact with a surface of a workpiece and when a voltage of a few volts is applied across said wire and said workpiece and such as to become electrically conductive when the voltage applied thereacross is comprised between said few volts and about 100 volts.

2. The electrode wire of claim 1 wherein said third material comprises at least one metal oxide.

3. The electrode wire of claim 2 wherein said second material is a metal and said oxide is an oxide of said metal.

4. The electrode wire of claim 3 wherein said second material contains a metal selected from the group consisting of zinc, cadmium, tin, lead, antimony, bismuth, magnesium, and alloys thereof.

5. The electrode wire of claim 4 wherein said second material contains at least one oxide of said metal.

6. The electrode wire of claim 2 wherein said oxide is selected from the group consisting of $CuO$, $Cu_2O$, $CdO$, $ZnO$, $SnO$, $Sn_2O$, $SbO$, $Sb_2O_3$, $Sb_2O_5$, $Bi_2O_3$, $Bi_2O_5$, $In_2O_3$, $PbO$, $TiO_2$, $MnO_2$, $MgO$, $NiO$ and $Al_2O_3$.

7. The electrode wire of claim 2 wherein said metal oxide film has a thickness of between 200 and 2,000 Å.

8. The electrode wire of claim 2 wherein said metal oxide film is water-wettable.

9. The electrode wire of claim 1 wherein said third material is selected from the group consisting of metallic carbides, borides, silicides, sulfides and nitrides.

10. The electrode wire of claim 1 wherein said coating is porous.

11. The electrode wire of claim 1 wherein said coating comprises at least two superimposed layers of said second material, each of said layers being covered by a thin film of said non-metallic third material.

12. The electrode wire of claim 11 wherein said layers contain each at least 80% zinc and said thin films are made of zinc oxide.

13. The electrode wire of claim 1 wherein said layer contains each at least 80% zinc and said thin films are made of zinc oxide.

14. A process for cutting a workpiece by an electrode wire made of a core of a first material being a substantially good conductor of electricity provided with a coating of a second material having a temperature of vaporization and fusion lower than that of said first material, said coating being provided at least with a superficial thin film of a non-metallic third material, said thin film having a thickness sufficient to exhibit semiconductor qualities when placed in contact with said workpiece while applying across said wire and said workpiece a voltage of a few volts and capable of becoming electrically conductive as a result of breakdown of said film when said voltage is comprised between said few volts and 100 volts, said method comprising connecting a voltage pulse generator across said electrode wire and said workpiece for applying thereacross electrical pulses of a voltage sufficient to cause said film breakdown.

15. A process for making a wire electrode for use in an EDM apparatus, said process comprising coating on the surface of the wire made of a first metal a layer comprising a second and different metal, and oxidizing the surface of said layer for forming a thin film of oxide of said second metal, wherein said oxide film is obtained by heating in the presence of oxygen.

16. The process of claim 15 further comprising coating on said oxide thin film at least one additional layer of said second metal and oxidizing the surface of said additional layer for forming a thin film of oxide of said second metal.

17. A process for making a wire electrode for use in an EDM apparatus, said process comprising coating on the surface of the wire made of a first metal a layer comprising a second and different metal, and oxidizing the surface of said layer for forming a thin film of oxide of said second metal, wherein said oxide film is obtained by anodizing the surface of said second layer in an electrolytic bath.

18. The process of claim 17 further comprising coating on said oxide thin film at least one additional layer of said second metal and oxidizing the surface of said additional layer for forming a thin film of oxide of said second metal.

* * * * *